United States Patent
Richardson

(10) Patent No.: US 11,391,156 B2
(45) Date of Patent: Jul. 19, 2022

(54) STATIC ROTOR BLADE ASSEMBLY BALANCING

(71) Applicant: Bell Textron Inc., Fort Worth, TX (US)

(72) Inventor: Kylie Richardson, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 255 days.

(21) Appl. No.: 16/750,111

(22) Filed: Jan. 23, 2020

(65) Prior Publication Data

US 2021/0231016 A1    Jul. 29, 2021

(51) Int. Cl.
   *G01M 1/12*    (2006.01)
   *F01D 5/02*    (2006.01)
   *G01M 1/32*    (2006.01)

(52) U.S. Cl.
   CPC ............... *F01D 5/027* (2013.01); *G01M 1/32* (2013.01)

(58) Field of Classification Search
   CPC ................................................ G01M 1/12–122
   See application file for complete search history.

(56) References Cited

U.S. PATENT DOCUMENTS

| | | | | | |
|---|---|---|---|---|---|
| 710,148 | A | * | 9/1902 | Hodgkinson | G01M 1/12 73/482 |
| 890,710 | A | * | 6/1908 | Riddell | G01M 1/12 73/483 |
| 1,091,708 | A | * | 3/1914 | Riddell | G01M 1/12 73/483 |
| 2,060,901 | A | * | 11/1936 | Smith | G01M 1/00 29/889.21 |
| 2,110,343 | A | * | 3/1938 | Taylor | G01M 1/30 73/483 |
| 2,192,363 | A | * | 3/1940 | Moos | G01M 1/12 73/483 |
| 2,193,628 | A | * | 3/1940 | Hem | G01M 1/12 73/456 |
| 2,270,657 | A | * | 1/1942 | Kraft | G01M 1/12 73/484 |
| 2,298,656 | A | * | 10/1942 | Smith | G01M 1/122 73/459 |
| 2,306,528 | A | * | 12/1942 | Jones | G01M 1/12 384/244 |
| 2,316,524 | A | * | 4/1943 | Martin | G01M 1/12 73/459 |
| 2,341,443 | A | * | 2/1944 | Hunter, Jr. | G01M 1/28 73/457 |

(Continued)

OTHER PUBLICATIONS

Peterson, M. (n.d.). Blade Balance. AirMark Helicopters. Retrieved Feb. 9, 2017, from https://airmarkhelo.com/blade_balance. (Year: 2017).*

*Primary Examiner* — Alexander A Mercado

(74) *Attorney, Agent, or Firm* — Shackelford, Bowen, McKinley & Norton, LLP

(57) ABSTRACT

An exemplary static rotor blade assembly balancing tool includes a vertical rod having a top end with a tip located at the top end on a vertical axis of the rod and a sleeve having a bore terminating at a socket, in use the rod is disposed in the bore and the tip and the socket form a pivot connection where the sleeve is balanced to settle in a level position with a vertical axis of the sleeve coaxial with the vertical axis of the rod, and the sleeve has an outer profile configured to mount a hub of a rotor blade assembly.

20 Claims, 6 Drawing Sheets

(56) References Cited

U.S. PATENT DOCUMENTS

| | | | |
|---|---|---|---|
| 2,430,948 A | | 11/1947 | Platt |
| 2,451,541 A | | 10/1948 | Doman |
| 2,461,591 A | * | 2/1949 | Currier .................. G01M 1/12 73/484 |
| 2,481,256 A | * | 9/1949 | Sutton ..................... G01M 1/12 73/486 |
| 2,502,633 A | * | 4/1950 | Shepard .................. G01M 1/12 73/484 |
| 2,506,002 A | * | 5/1950 | Tinkham ................. G01M 1/12 73/484 |
| 2,553,058 A | * | 5/1951 | Martin .................... G01M 1/04 73/459 |
| 2,565,732 A | * | 8/1951 | Koertge .................. G01M 1/12 73/484 |
| 2,588,766 A | * | 3/1952 | Rogers ................... G01M 1/12 73/484 |
| 2,592,804 A | * | 4/1952 | Holl ...................... G01M 1/045 73/484 |
| 2,669,120 A | | 2/1954 | Jensen et al. |
| 2,674,122 A | * | 4/1954 | Goltra .................... G01M 1/12 73/484 |
| 2,679,751 A | * | 6/1954 | Pfeiffer .................. G01M 1/12 56/DIG. 4 |
| 2,720,110 A | * | 10/1955 | Lucht ..................... G01M 1/12 73/484 |
| 2,879,667 A | * | 3/1959 | Henderson ............ G01M 1/045 73/483 |
| 2,968,185 A | * | 1/1961 | Jacobsen ................. G01M 1/16 73/459 |
| 2,979,958 A | * | 4/1961 | Kennedy ................. G01M 1/12 73/483 |
| 3,017,774 A | * | 1/1962 | Thompson ............ G01M 1/326 73/487 |
| 3,122,021 A | * | 2/1964 | Karig ..................... G01M 1/12 73/485 |
| RE26,047 E | * | 6/1966 | Freeman ................. G01M 1/12 73/455 |
| 3,280,640 A | * | 10/1966 | Fuertges ................. G01M 1/12 73/484 |
| 3,320,814 A | * | 5/1967 | Krause ................... G01M 1/12 73/484 |
| 3,352,732 A | * | 11/1967 | Darr ....................... G01M 1/12 73/485 |
| 3,357,259 A | * | 12/1967 | Hansen .................. G01M 1/12 73/487 |
| 3,433,534 A | * | 3/1969 | Mercer ................. F16F 15/363 301/5.22 |
| 3,830,109 A | * | 8/1974 | Litvinovich ........... G01M 1/36 73/455 |
| 3,952,601 A | | 4/1976 | Galli et al. |
| 4,041,781 A | * | 8/1977 | Roberts, Jr. ............ G01M 1/12 73/483 |
| 4,046,018 A | * | 9/1977 | Lasiter ................... G01M 1/12 73/482 |
| 4,150,920 A | * | 4/1979 | Belko ................... B64C 27/473 416/145 |
| 4,236,426 A | * | 12/1980 | Meinke .................. F16F 15/10 192/30 R |
| 5,475,622 A | | 12/1995 | Reinfelder et al. |
| 5,824,897 A | | 10/1998 | Beachum et al. |
| 2016/0297518 A1 | | 10/2016 | Meyer et al. |

\* cited by examiner

STATIC ROTOR BLADE ASSEMBLY BALANCING

TECHNICAL FIELD

This disclosure relates in general to the field of balancing rotating apparatuses, and more particularly, to a static balancing of a rotor blade assembly of an aircraft.

BACKGROUND

This section provides background information to facilitate a better understanding of the various aspects of the disclosure. It should be understood that the statements in this section of this document are to be read in this light, and not as admissions of prior art.

Aircraft rotor blades are often manufactured with an assembly of components, which can result in variations from one rotor blade to the next in weight and weight distribution. Variations between rotor blades result in rotor blade assemblies that are unbalanced. In operation, unbalanced rotor blade assemblies produce excessive vibration and can result in failure of the rotor blade assembly.

SUMMARY

An exemplary static rotor blade assembly balancing tool includes a vertical rod having a top end with a tip located at the top end on a vertical axis of the rod and a sleeve having a bore terminating at a socket, in use the rod is disposed in the bore and the tip and the socket form a pivot connection where the sleeve is balanced to settle in a level position with a vertical axis of the sleeve coaxial with the vertical axis of the rod, and the sleeve has an outer profile configured to mount a hub of a rotor blade assembly.

An exemplary method for balancing a rotor blade assembly includes connecting a sleeve in a hub of a rotor blade assembly, the sleeve having a bore terminating at a socket, mounting the sleeve and the rotor blade assembly on a vertical rod having a tip, where the vertical rod is disposed in the bore and the tip and the socket are in pivoting contact, measuring a balance of the rotor blade assembly and balancing the rotor blade assembly if it is not balanced.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
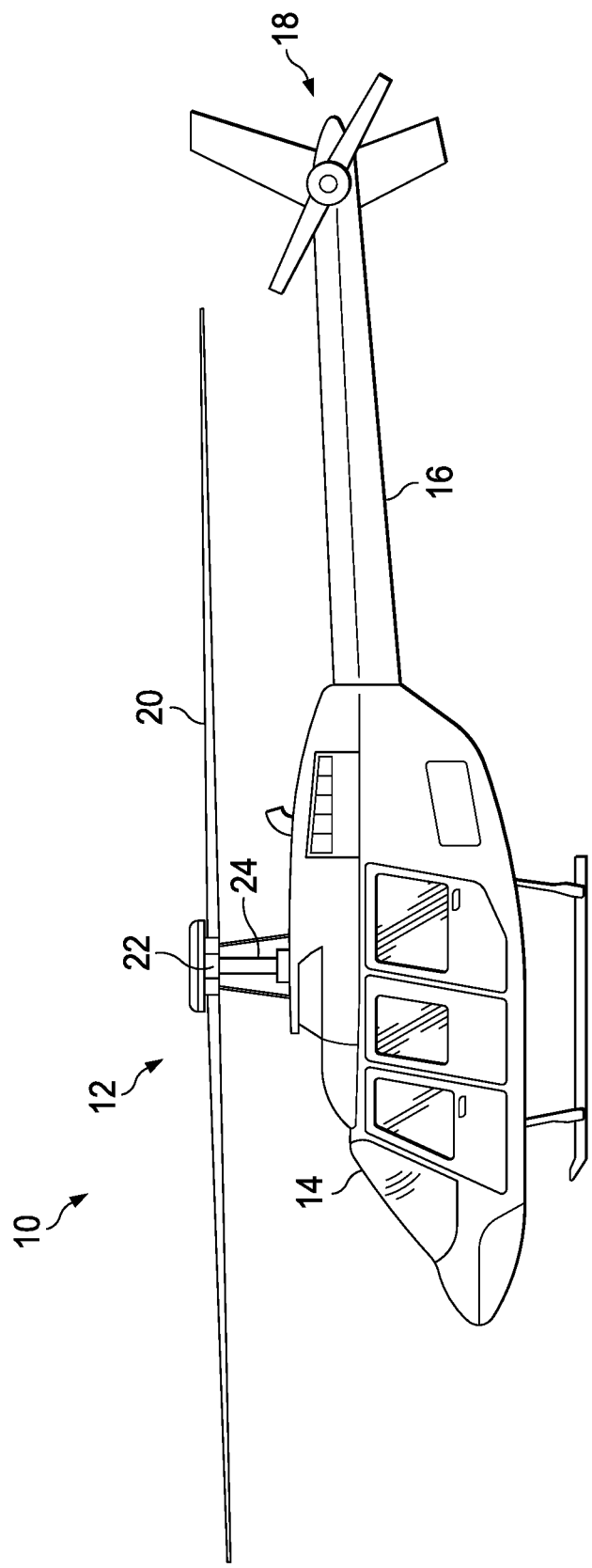
FIG. 1 illustrates an exemplary rotor blade assembly in an exemplary aircraft.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

FIG. 1 illustrates an exemplary aircraft depicted as a vertical takeoff and landing (VTOL) rotary aircraft 10. Aircraft 10 includes a rotor blade assembly 12, a fuselage 14, and a tail boom 16 carrying an anti-torque system represented by rotor blade assembly 18. Rotor blade assembly 12, which is representative of tail rotor blade assembly 18, includes two or more blades 20 extending laterally outward from a central hub 22 that is coupled to a mast 24 (drive shaft). Rotor blade assembly 12 is illustrated in this example as a main rotor of a helicopter, however, it should be recognized that the static rotor blade assembly balancing tool and method disclosed herein may be utilized with rotor systems used in tail rotor systems as well as other types of aircraft, manned and unmanned, including airplanes and tiltrotor aircrafts.

Figure 2:
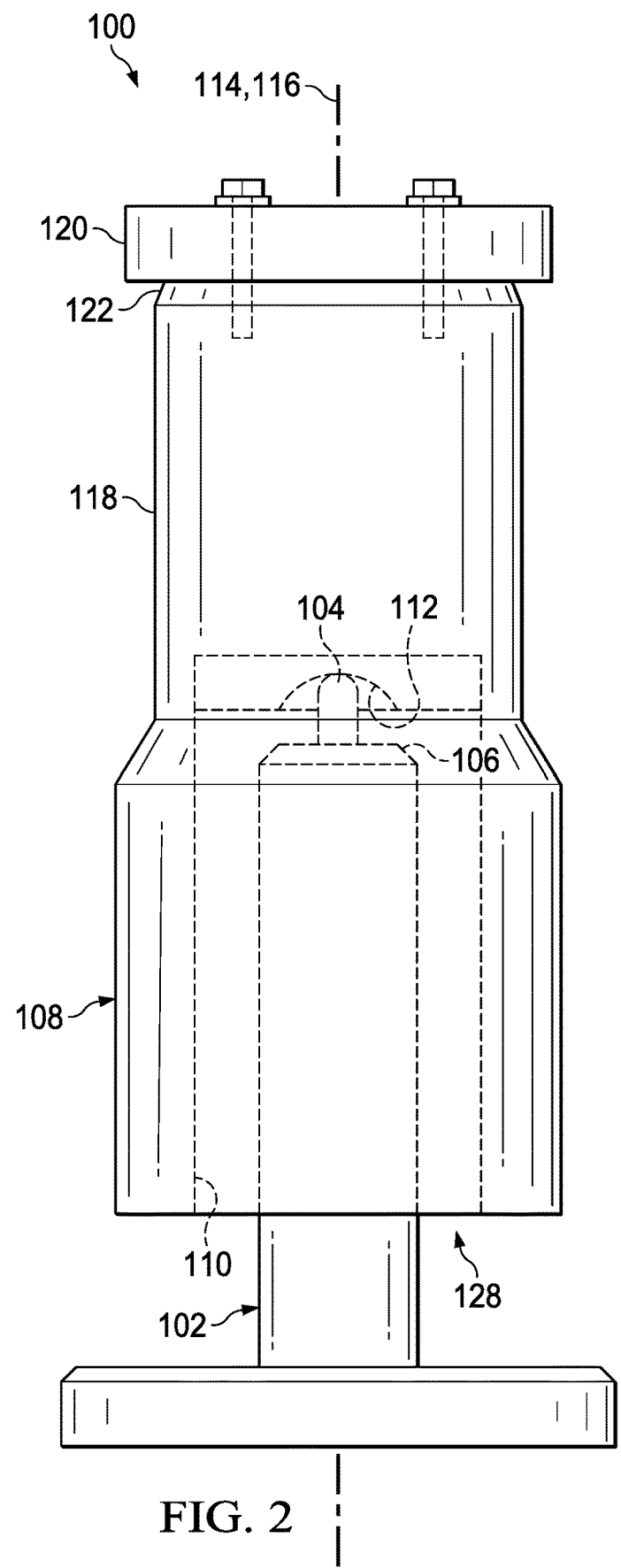
FIG. 2 illustrates an exemplary static rotor blade assembly balancing tool.

FIG. 2 depicts two orthogonal directions X and Y forming a two-dimensional frame of reference. Vertical axis Y corresponds to the direction of gravity and is representative of the vertical direction and horizontal axis X corresponds to the horizontal direction orthogonal to vertical.

FIG. 2 illustrates an exemplary static rotor blade assembly balancing tool 100. With additional reference to FIGS. 3-6, tool 100 includes a vertical rod 102 having a tip 104 (balancing tip) located at the top end 106 of rod 102 and a sleeve 108 that has a bore 110 terminating at a socket 112. For use, as illustrated in FIG. 2, rod 102 is disposed inside of bore 110 with tip 104 and socket 112 forming a pivot connection. The apex of socket 112 is the pivot point when sleeve 108 and rotor blade assembly are positioned on vertical rod 102 and tip 104. The socket is formed to position the apex (pivot point) at a location that will be at or above the center of gravity of the rotor blade assembly. Sleeve 108 is balanced such that when it is positioned on tip 104, as shown in FIG. 1, it settles in a level, or balanced, position where the vertical axis 114 of rod 102 and the vertical axis 116 of sleeve 108 are co-axial and parallel to vertical axis X (FIG. 1). The level of sleeve 108 can be measured in various manners including with a bubble level.

Sleeve 108 has an outer profile 118 configured to mount and connect to a hub of a rotor blade assembly. Sleeve 108 may be constructed to simulate the mast that corresponds with the rotor blade assembly to be balanced. A nut 120, e.g. a mock mast nut, is connectable to the top end 122 of sleeve 108 to secure the rotor blade assembly on the sleeve. The diameter 124 (FIG. 3) of rod 102 and the diameter 126 (FIG. 4) of bore 110 may be selected to achieve a selected tolerance 128. Tolerance 128 may be selected to limit the extent that sleeve 108 may tilt relative to the vertical axis and thus prevent the blades of an unbalanced rotor blade assembly from hitting the ground during balance testing. An exemplary tolerance 128 is less than about 1-inch.

The pivoting connection of tip 104 and socket 112 is configured to minimize friction therebetween and to promote detection of an unbalance rotor blade assembly. In accordance to an embodiment, tip 104 and socket 112 are constructed of steel to facilitate the required strength to support the rotor blade assembly and minimize the surface area of the contact between tip 104 and socket 112. In accordance with an embodiment, tip 104 and socket 112 are constructed of heat treated steel.

Figure 3:
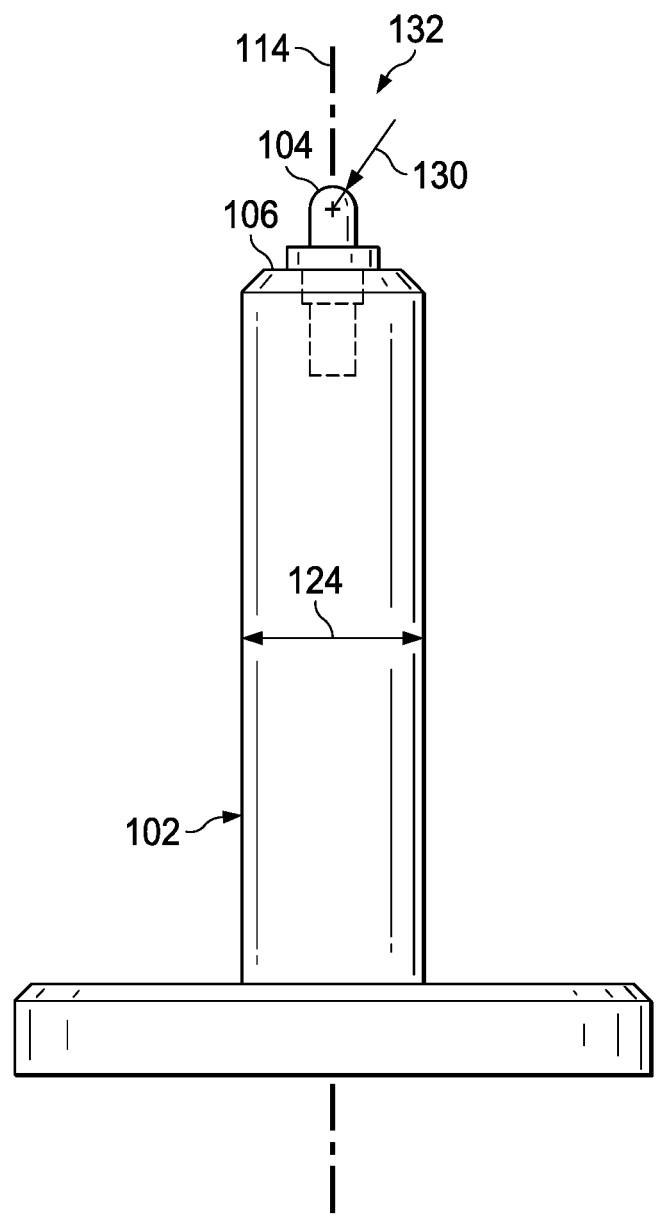
FIG. 3 illustrates an exemplary vertical rod and balancing tip of a static rotor blade assembly balancing tool.

FIG. 3 illustrates an exemplary vertical rod 102. Rod 102 has a diameter 124. In a non-limiting example, diameter 124 is approximately 2 inches. Vertical rod 102 has a vertical axis 114 and includes a tip 104 located at top end 106. Tip 104 is centered on vertical axis 114. Tip 104 has a curved surface with a radius 130. In a non-limiting example, radius 130 is approximately 0.25 inches. Tip 104 may be an independent structure 132, e.g. an insert, that is connected at top end 106. Rod 102 and tip 104 may be constructed of the same material or of different material. In an example, rod 102 is constructed of steel and tip 104 is constructed of heat treated steel.

Figure 4:
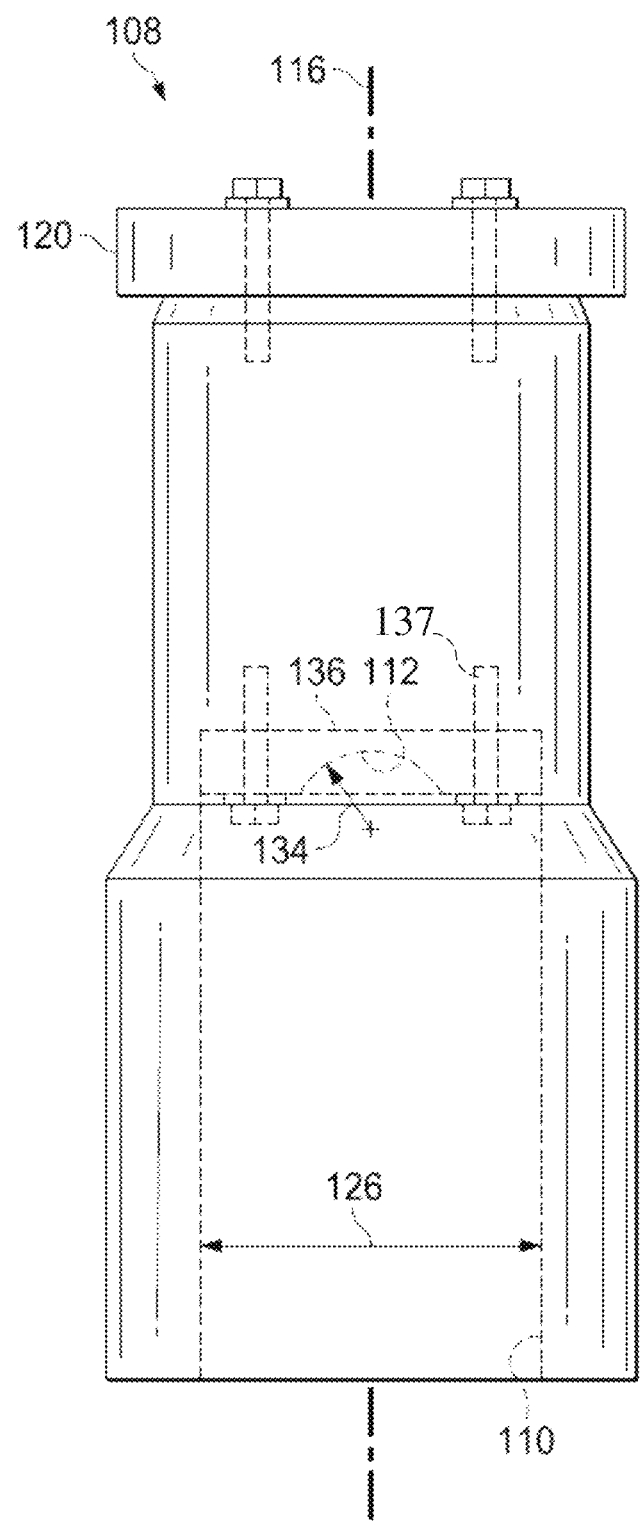
FIG. 4 illustrates an exemplary sleeve and balancing socket of a static rotor blade assembly balancing tool.

FIG. 4 illustrates an exemplary sleeve 108 having a vertical axis 116. Sleeve 108 has an internal bore 110 terminating at socket 112. Bore 110 has a diameter 126. In a non-limiting example, diameter 126 is approximately 3.7 inches. Socket 112 forms a concave surface having a radius 134. Socket 112 is centered on vertical axis 116. In a non-limiting example, socket radius 134 is approximately 0.75 inches. Socket 112 may be formed in the interior surface of sleeve 108. In an exemplary embodiment, socket 112 is formed in a plate 136 that is secured to the sleeve, for example via bolts 137, inside of bore 110. Socket 112 and sleeve 108 may be constructed of the same material or different material. In an exemplary embodiment, socket 112 is formed of steel and in another embodiment, it is formed of heat treated steel. In an embodiment, sleeve 108 is formed of aluminum and socket 112 is formed of steel or heat treated steel.

Figure 5:
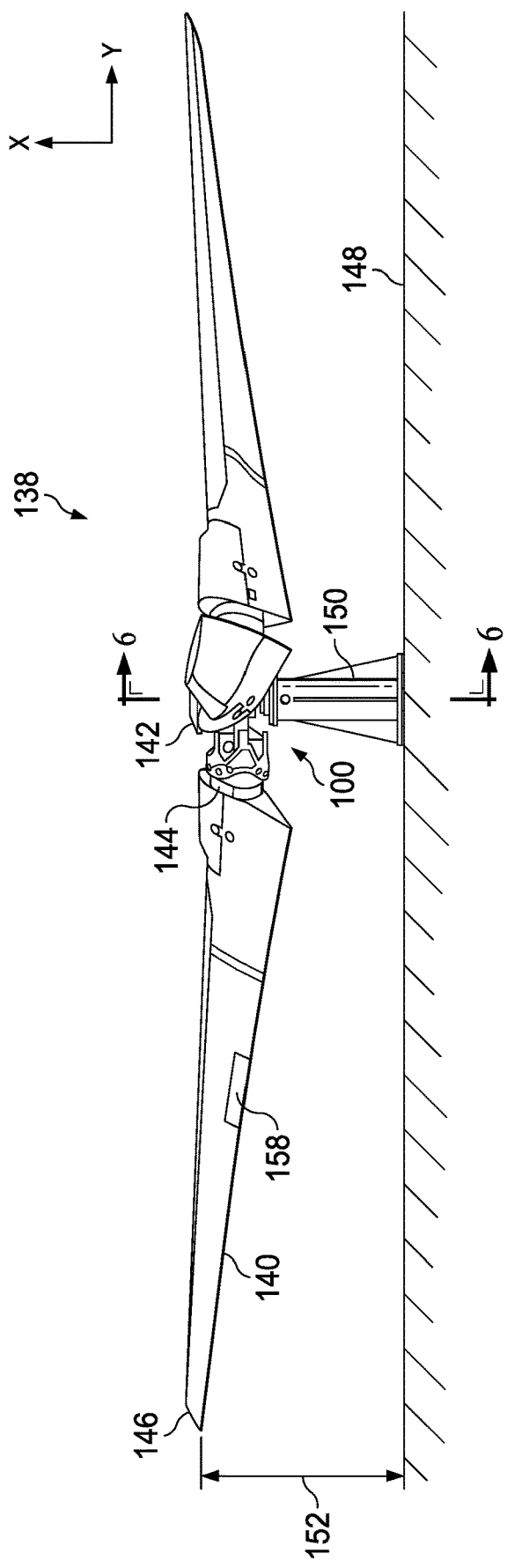
FIG. 5 illustrates an exemplary rotor blade assembly mounted on a static rotor blade assembly balancing tool.

An exemplary method of balancing a rotor blade assembly is now described with reference to FIGS. 5 and 6. With additional reference to FIGS. 1-4, a rotor blade assembly 138 is mounted on static rotor blade assembly balancing tool 100. Rotor blade assembly 138 includes two or more blades 140 extending laterally from hub 142. Blades 140 extend from a root end 144 at hub 142 to a tip end 146. Sleeve 108 is positioned in hub 142 and secured in place by nut 120.

After rotor blade assembly 138 is secured to sleeve 108, vertical rod 102 is positioned in bore 110 with tip 104 in pivoting contact (pivot point) with socket 112. Vertical rod 102 supports rotor blade assembly 138 above ground level 148. In the example illustrated in FIGS. 5 and 6, vertical rod 102 is mounted on a mount 150. In some embodiments, tolerance 128 (FIG. 2) may be associated with the length of blade 140 extending from hub 142 to tip end 146 and the height 152 of tip end 146 above ground level 148 so that tip end 146 will not strike ground level 148 when the rotor blade assembly is unbalanced.

Once rotor blade assembly 138 is positioned on tip 104 of rod 102, the balance of rotor blade assembly 138 is measured. For example, when the rotor blade assembly is balanced a horizontal axis 154 of rotor blade assembly 138 will be orthogonal to vertical. The level, or balance, of rotor blade assembly may be measured using one or more bubble levels 156. In an example, bubble level 156 is placed on the hub, for example, bubble levels 156 may be positioned on the hub proximate each blade root end. If the rotor blade assembly is not balanced, weights 158 may be added to one or more blades 138.

Figure 6:
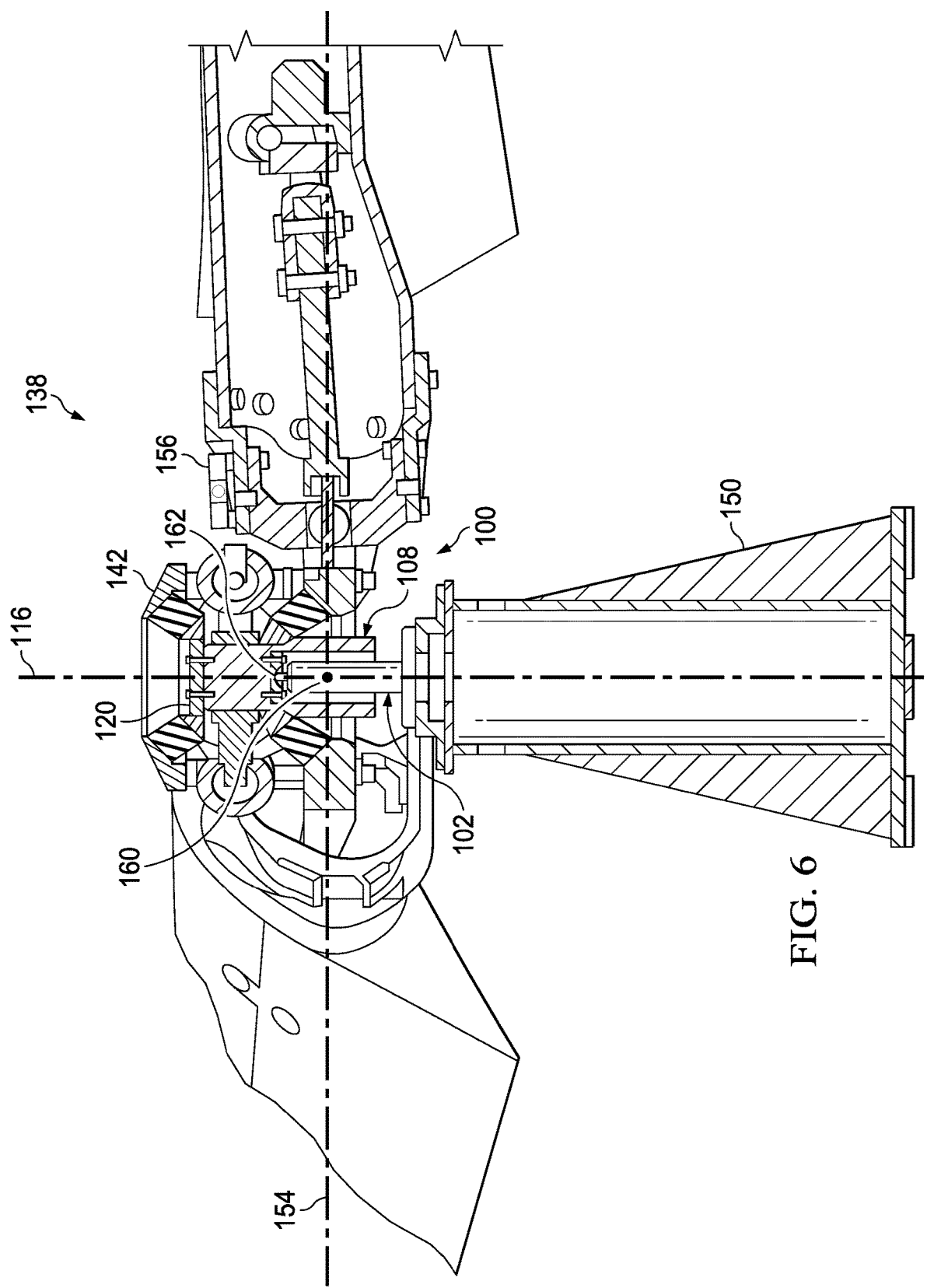
FIG. 6 is a sectional view along the line 6-6 of FIG. 5 of a rotor blade assembly mounted on a static rotor blade assembly balancing tool.

In FIG. 6, horizontal axis 154 of rotor blade assembly 138 and vertical axis 114 of rod 102 pass through the center of gravity 160 of the balanced rotor blade assembly 138. The pivot point 162 of static rotor blade assembly balancing tool 100 is located vertically at or above center of gravity 160. In this non-limiting example, pivot point 162 is about 1.5 inches above center of gravity 160.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A static rotor blade assembly balancing apparatus, the apparatus comprising:
    a vertical rod having a top end;
    a tip located at the top end on a vertical axis of the rod;
    a sleeve having a bore terminating at a socket, in use the rod is disposed in the bore and the tip and the socket form a pivot connection, wherein the sleeve is balanced to settle in a level position with a vertical axis of the sleeve coaxial with the vertical axis of the rod and wherein the sleeve has an outer profile configured to mount a hub of a rotor blade assembly; and
    a plate secured to the sleeve inside of the bore by a fastener that extends through the plate and into the sleeve, wherein the socket is formed in the plate and the fastener extends parallel to the vertical axis of the sleeve.

2. The apparatus of claim 1, wherein the tip and the socket are constructed of steel.

3. The apparatus of claim 1, wherein the tip and the socket are constructed of heat treated steel.

4. The apparatus of claim 1, wherein the tip and the socket are constructed of steel and the sleeve is constructed of aluminum.

5. The apparatus of claim 1, wherein the tip has a radius of approximately 0.25 inches.

6. The apparatus of claim 1, wherein the tip has a radius of approximately 0.25 inches and the socket has a radius of approximately 0.75 inches.

7. The apparatus of claim 1, wherein the bore has a diameter of approximately 3.7 inches and the rod has a diameter of approximately 2.0 inches.

8. The apparatus of claim 1, wherein the tip has a curved surface with a radius of approximately 0.25 inches;
    the socket has a concave surface with a radius of approximately 0.75 inches;
    the bore has a diameter of approximately 3.7 inches; and
    the rod has a diameter of approximately 2.0 inches.

9. The apparatus of claim 1, wherein the fastener is a bolt.

10. The apparatus of claim 9, wherein the tip has a curved surface and the socket has a concave surface.

11. The apparatus of claim 10, wherein the tip has a radius of approximately 0.25 inches and the socket has a radius of approximately 0.75 inches.

12. The apparatus of claim 10, wherein the tip has a curved surface with a radius of approximately 0.25 inches; and
    the socket has a concave surface with a radius of approximately 0.75 inches.

13. A method for balancing a rotor blade assembly, the method comprising:
    connecting a sleeve to a hub of the rotor blade assembly, the sleeve having a bore terminating at a socket, the socket formed in a plate that is secured to the sleeve inside of the bore by a fastener that extends through the plate and into the sleeve;
    mounting the sleeve and the rotor blade assembly on a vertical rod having a tip, wherein the vertical rod is disposed in the bore and the tip and the socket are in pivoting contact at a pivot point;
    measuring a balance of the rotor blade assembly; and
    balancing the rotor blade assembly if it is not balanced.

14. The method of claim 13, wherein the pivot point is located at or above a center of gravity of the rotor blade assembly.

15. The method of claim 13, wherein the balancing the rotor blade assembly comprises adding a weight to a rotor blade.

16. The method of claim 13, wherein the pivot point is located at or above a center of gravity of the rotor blade assembly; and
    the balancing the rotor blade assembly comprises adding a weight to a rotor blade.

17. The method of claim 13, wherein the tip and the socket are constructed of steel.

18. The method of claim 13, wherein the tip and the socket are constructed of steel and the sleeve is constructed of aluminum.

19. The method of claim 18, wherein the pivot point is located at or above a center of gravity of the rotor blade assembly; and
    the balancing the rotor blade assembly comprises adding a weight to a rotor blade.

20. The method of claim 13, wherein the fastener is a bolt.

* * * * *